(12) United States Patent  (10) Patent No.: US 8,155,212 B2
Ju  (45) Date of Patent: Apr. 10, 2012

(54) SYSTEM AND METHOD FOR OUTPUTTING VIDEO STREAMS

(75) Inventor: Chi-Cheng Ju, Hsinchu (TW)

(73) Assignee: MediaTek Inc., Hsin-Chu (TW)

( * ) Notice: Subject to any disclaimer, the term of this patent is extended or adjusted under 35 U.S.C. 154(b) by 1170 days.

(21) Appl. No.: 11/936,178

(22) Filed: Nov. 7, 2007

(65) Prior Publication Data

US 2008/0123753 A1  May 29, 2008

Related U.S. Application Data

(60) Provisional application No. 60/867,131, filed on Nov. 24, 2006.

(51) Int. Cl.
*H04N 11/02* (2006.01)
*H04N 11/04* (2006.01)
*H04N 7/12* (2006.01)

(52) U.S. Cl. .................................. 375/240.26

(58) Field of Classification Search ........................ None
See application file for complete search history.

(56) References Cited

U.S. PATENT DOCUMENTS

| | | | |
|---|---|---|---|
| 6,137,952 A * | 10/2000 | Hogan | 386/254 |
| 7,227,559 B2 | 6/2007 | Aoki et al. | |
| 7,719,551 B2 | 5/2010 | Aoki et al. | |
| 7,876,301 B2 | 1/2011 | Aoki et al. | |
| 7,898,557 B2 | 3/2011 | Aoki et al. | |
| 2004/0036703 A1 | 2/2004 | Aoki et al. | |
| 2005/0013373 A1 | 1/2005 | Lin et al. | |
| 2005/0063471 A1 | 3/2005 | Regunathan et al. | |
| 2005/0099546 A1 * | 5/2005 | Zhu | 348/645 |
| 2006/0093036 A1 | 5/2006 | Park et al. | |
| 2007/0216816 A1 | 9/2007 | Aoki et al. | |
| 2009/0059083 A1 | 3/2009 | Aoki et al. | |
| 2009/0153596 A1 | 6/2009 | Aoki et al. | |
| 2010/0177248 A1 | 7/2010 | Aoki et al. | |

FOREIGN PATENT DOCUMENTS

CN  1225544  8/1999

OTHER PUBLICATIONS

CN Office Action mailed Jul. 10, 2009.
English abstract of CN1225544.

* cited by examiner

*Primary Examiner* — Chirag Shah
*Assistant Examiner* — Minh-Trang Nguyen
(74) *Attorney, Agent, or Firm* — Thomas|Kayden

(57) ABSTRACT

A structure outputting a decoded video stream includes a processing block and a range modification circuit. The processing block decodes an input stream to generate and store a decoded stream in a decoded picture buffer, wherein the decoded stream comprises a luminance component and a chrominance component a decoded stream. The range modification circuit receives the decoded stream, and modifies, if required, a luminance range of the luminance component and a chrominance range of the chrominance component. The range modification circuit further outputs a video stream. The video stream comprises the modified luminance component when the luminance modification signal is true, and the video stream comprises the luminance component when the luminance modification is false. Similarly, the video stream comprises the modified chrominance component when the chrominance modification signal is true, and the video stream comprises the chrominance component when the chrominance modification signal is false.

16 Claims, 5 Drawing Sheets

SYSTEM AND METHOD FOR OUTPUTTING VIDEO STREAMS

BACKGROUND OF THE INVENTION

Field of the Invention

The invention relates to digital signal processing, and, more particularly, for digital image signal processing.

Digital video consumes large amounts of storage and transmission capacity. Thus, most digital videos are compressed for reducing the bit rate. The advantage for performing compression is to decrease the cost of storing and transmitting video by converting the video to a lower bit rate. Decompression reconstructs a version of the original video from the compressed video.

Fade compression, a video compression technique, utilizes motion prediction to reduce bit rate. For example, in a clip, luminance changes, such as, fade-to-black, fade-from-black or cross-fade can be modeled as scaling a luminance parameter up or down.

In conventional fading decompression, however, a frame buffer must be accessed many times. Thus, a video decompression system reducing the number of times the frame buffer accessed is desirable.

BRIEF SUMMARY OF THE INVENTION

Accordingly, an apparatus for outputting a video stream is provided, comprising a processing block, a decoded picture buffer, and a display block. The processing block decodes an input stream. The decoded picture buffer can be embedded in the processing block or outside of processing block depended on the design criteria. The decoded picture buffer stores the decoded input stream, wherein the decoded input stream comprises a luminance component and a chrominance component. The display block displays a video stream and comprises a range modification unit and a display module. The range modification unit retrieves the decoded input stream from the decoded picture buffer, wherein a luminance range of the luminance component of the decoded input stream is modified according to a luminance modification signal, and a chrominance range of the chrominance component of the decoded stream is modified according to a chrominance modification signal. The display module coupled to a range modification unit, outputs the video stream; wherein the video stream is generated according to an output of the range modification unit.

In one aspect of the invention, an apparatus for outputting a video stream is provided. The apparatus comprises a processing block, a decoded picture buffer, a decoded frame buffer, a range modification unit, and a display module. The processing block decodes an input stream. The decoded picture buffer stores the decoded input stream, wherein the decoded input stream comprises a luminance component and a chrominance component. The decoded frame buffer stores the luminance component of the decoded input stream retrieved from the decoded picture buffer if a luminance modification signal flag is true and stores the chrominance component of the decoded input stream retrieved from the decoded picture buffer if a chrominance modification signal flag is true, wherein the decoded frame buffer include two buffer sets, a decoded luminance frame buffer and a decoded chrominance frame buffer, to separate the luminance component and the chrominance component. The range modification unit retrieves the luminance component from the decoded luminance frame buffer and modifies a luminance range of the luminance component, and retrieves the chrominance component from the decoded chrominance frame buffer and modifies a chrominance range of the chrominance component. The display module coupled to the decoded frame buffer, displays a video stream, wherein the video stream comprises the modified luminance component if the luminance modification signal flag is true, and the video stream comprises modified chrominance component if the chrominance modification signal flag is true.

In another aspect of the invention, an apparatus for outputting a video stream is disclosed, comprising a processing block, a range modification unit, a decoded frame buffer, and a display module. The processing block decodes an input stream and storing the decoded input stream, wherein the decoded input stream comprises a luminance component and a chrominance component. The range modification unit modifies a luminance range of the luminance component retrieved from the processing block if a luminance modification signal flag is true, and modifies a chrominance range of the chrominance component retrieved from the processing block if a chrominance modification signal flag is true. The decoded frame buffer stores the modified chrominance component and the modified luminance component. The display module coupled to the decoded frame buffer, displays a video stream, wherein the video stream comprises a modified luminance component if the luminance modification signal flag is true, and the video stream comprises the modified chrominance component if the chrominance modification signal flag is true. The luminance component is directly outputted to the display module from the processing block if the luminance modification signal flag is false, and the chrominance component is directly outputted to the display module from the processing block if the chrominance modification signal flag is false In another aspect of the invention, an apparatus for outputting a video stream is described, comprising a processing unit, a range modification unit, a decoded frame buffer, and a display module. The processing unit decodes an input stream and storing the decoded input stream, wherein the decoded input stream comprises a luminance component and a chrominance component. The range modification unit modifies a luminance range of the luminance component retrieved from the processing block if a luminance modification signal flag is true; otherwise, the range modification unit directly outputs the luminance component retrieved from the processing block without modifying the luminance component, and modifies a chrominance range of the chrominance component retrieved from the processing block if a chrominance modification signal flag is true; otherwise, the range modification unit directly outputs the chrominance component retrieved from the processing block without modifying the chrominance component. The decoded frame buffer stores the modified chrominance component and the modified luminance component, and outputs a video stream. The display module coupled to the decoded frame buffer, displays a video stream, wherein the video stream comprises a modified luminance component if the luminance modification signal flag is true, and the video stream comprises the modified chrominance component if the chrominance modification signal flag is true.

In yet another aspect of the invention, an apparatus for outputting a video stream is disclosed, comprising a processing unit, a range modification unit, a decoded buffer, a range recovery device, and a display module. The processing unit decodes an input stream and stores the decoded input stream, wherein the decoded input stream comprises a luminance component and a chrominance component. The range modification unit modifies a luminance range of the luminance component retrieved from the processing block if a luminance modification signal flag is true; otherwise, the range modification unit directly outputs the luminance component retrieved from the processing block without modifying the luminance component, and modifies a chrominance range of the chrominance component retrieved from the processing block if a chrominance modification signal flag is true; otherwise, the range modification unit directly outputs the chrominance component retrieved from the processing block without modifying the chrominance component. The decoded buffer stores at least one of the luminance components and the modified luminance components, and at least one of the chrominance components and the modified chrominance components. The range recovery device inverts the modified luminance component to the luminance component and inverts the modified chrominance component to the chrominance component, and sends the inverted luminance component and the inverted chrominance component to the processing block. The display module coupled to the decoded frame buffer, displays a video stream, wherein the video stream comprises the modified luminance component if the luminance modification signal flag is true, and the video stream comprises the modified chrominance component if the chrominance modification signal flag is true.

BRIEF DESCRIPTION OF THE DRAWINGS

The invention will become more fully understood from the detailed description, given herein below, and the accompanying drawings. The drawings and description are provided for purposes of illustration only, and, thus, are not intended to be limiting of the invention.

DETAILED DESCRIPTION OF THE INVENTION

Video decompression systems may comprise decoding and fade decompression. For example, a modern video compression/decompression specification VC-1 includes a processing block for decoding input stream and a range modification circuit and a frame buffer performing fade decompression.

Figure 1:
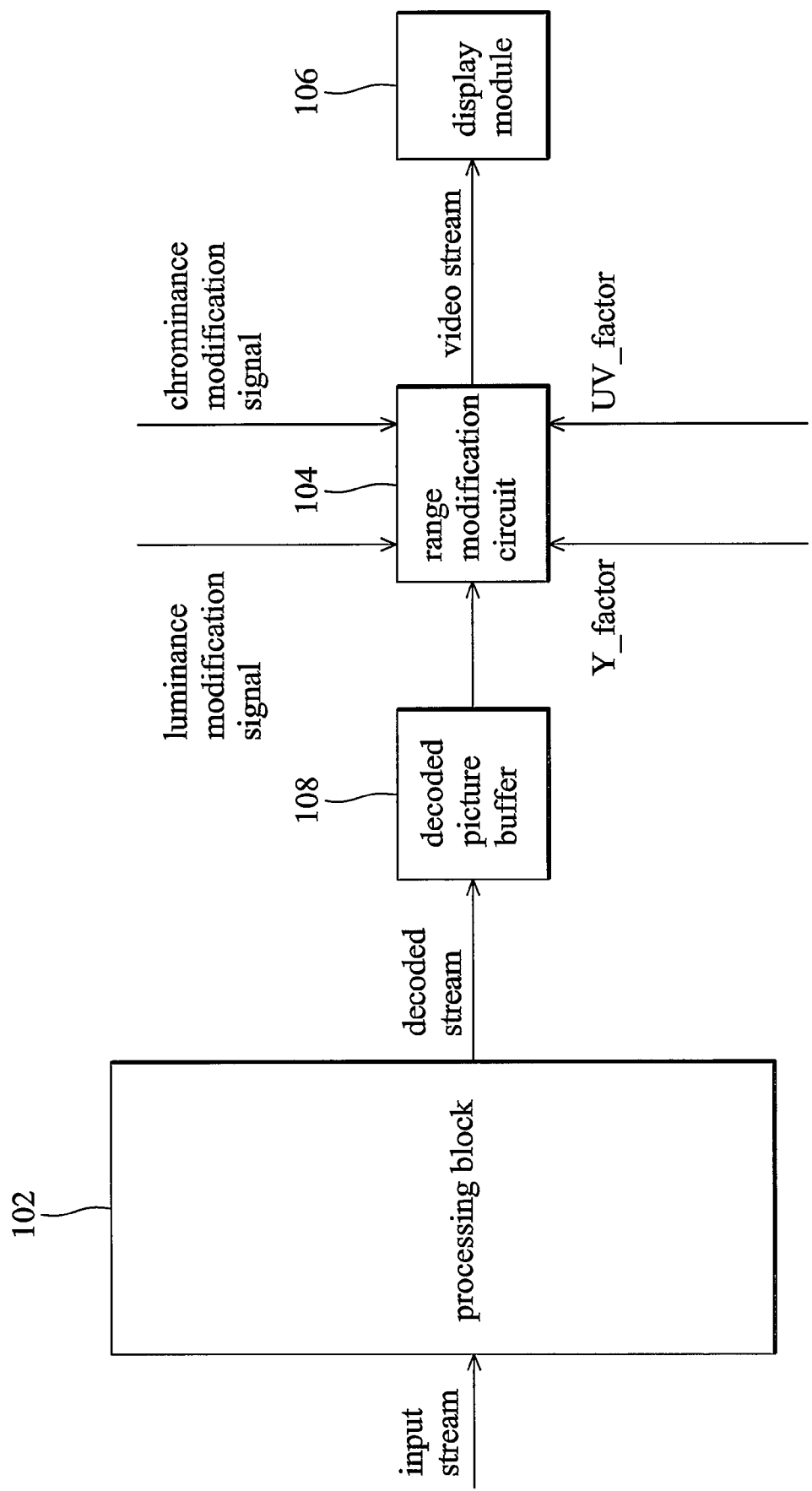
FIG. 1 shows a block diagram of a system for outputting a video stream according to an embodiment of the invention.

FIG. 1 shows a block diagram of a system for outputting a video stream according to an embodiment of the invention. A processing block 102 decodes an input stream to a decoded stream and a decoded picture buffer 108 stores the decoded stream. The processing block 102 may be a video decoder, for example, a decoder may comprise of inter macroblock decoding process, such as a variable length decoder module, an inverse quantization module, an inverse transformation module, a motion compensation module, a loop filter, and others. The decoded stream comprises a luminance component and chrominance component. A range modification circuit 104 retrieves the decoded stream from the decoded picture buffer, and modifies, if required, a luminance range of the luminance component and a chrominance range of the chrominance component. If, for example, a luminance modification signal is true, the luminance range is modified. Similarly, if a chrominance modification signal is true; then, a chrominance range of the chrominance component is modified. The range modification circuit 104 then outputs a video stream. When the luminance modification signal is true, the video stream comprises the modified luminance component; and, when the chrominance modification signal is true, the video stream comprises the modified chrominance component. When the luminance modification signal is false, the video stream comprises the luminance component, which retrieved directly from decoded picture buffer 108 or from range modification circuit 104 but without range modification processing. Similarly, when the chrominance modification signal is false, the video stream comprises the chrominance component, which retrieved directly from decoded picture buffer 108 or from range modification circuit 104 but without range modification processing. A display module 106 may concatenate with the range modification circuit 104 to display the video stream.

In some embodiments, the range modification circuit 104 performs the following formula modifies the luminance range of the luminance component by the following formula:

$$Y'[n] = CLIP((((Y[n]-128)*(Y\_factor+9)+4)>>3)+128), \quad (1)$$

wherein Y[n] is the luma component of the decoded stream, Y_factor is a luma modification factor, and Y'[n] is the modified luma component. '>>3' indicates shifting right by 3 digits; for example, '101111>>3' equals 000101. The range modification circuit 104 may further modify the chrominance range of the chrominance component by the following formula:

$$Cb'[n] = CLIP((((Cb[n]-128)*(UV\_factor+9)+4)>>3)+128), \text{ and} \quad (2)$$

$$Cr[n] = CLIP((((Cr[n]-128)*(UV\_factor+9)+4)>>3)+128) \quad (3),$$

wherein Cb[n] is the Cb portion of the chrominance component, Cr[n] is the Cr portion of the chrominance component, UV_factor is a chrominance modification factor, and Cb'[n] and Cr'[n] are the modified chrominance components. CLIP is a function for clipping a value to certain range. In the embodiment, the clipped range is from 0 to 255.

Figure 2:
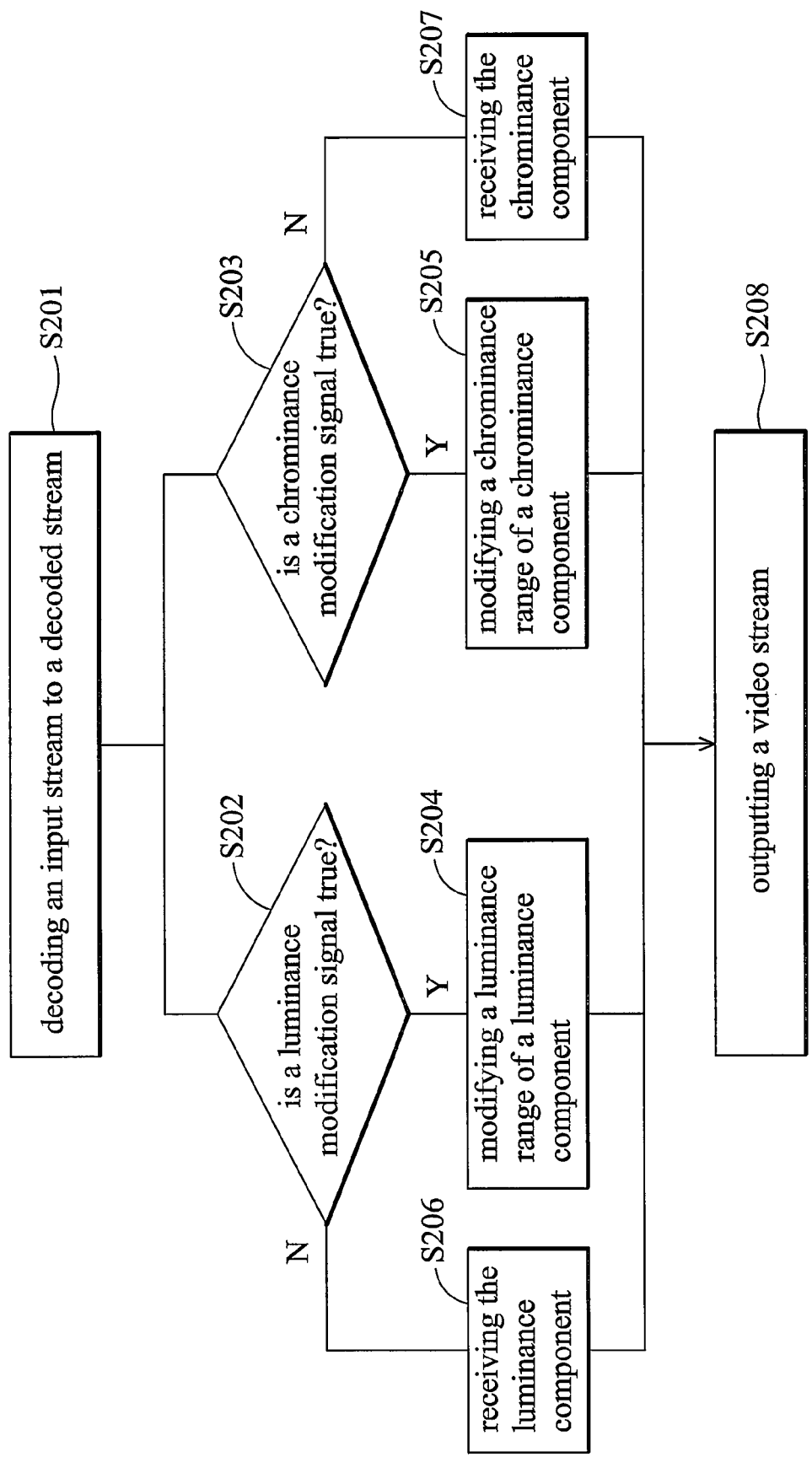
FIG. 2 shows a flowchart of decoding a video bit stream.

FIG. 2 shows a flowchart of decoding a video bit stream. In step S201, an input stream is decoded to a decoded stream, wherein the decoded stream comprises a luminance component and a chrominance component. The decoded stream is stored in a decoded picture buffer. A luminance modification signal and a chrominance modification signal are checked in steps S202 and S203, respectively. If a luminance modification signal is true, a luminance range of the luminance component is modified in S204; otherwise, the luminance component is received in S206. Similarly, a chrominance range of the chrominance component is modified if the chrominance modification signal is true in step S205; otherwise, the chrominance component is received in S207. As step 206, if the luminance modification signal is false, the luminance component of the decoded stream is retrieved from a decoded picture buffer 108 directly, or a range modification circuit 104 but without processing the range modification processes. As step S207, if the chrominance modification signal is false, the chrominance component of the decoded stream is retrieved from the decoded picture buffer 108 directly or a range modification circuit 104 but without processing the range modification processes. Of course the decoded picture buffer can also be located at inside of the processing block 102 for storing the components of the decoded stream. In step S208, a video stream is output. The video stream comprises the modified luminance component when the luminance modification signal is true, and the video stream comprises the luminance component when the luminance modification signal is false. Similarly, the video stream comprises the modified chrominance component when the chrominance modification signal is true, and the video stream comprises the chrominance component when the chrominance modification signal is false.

Figure 3:
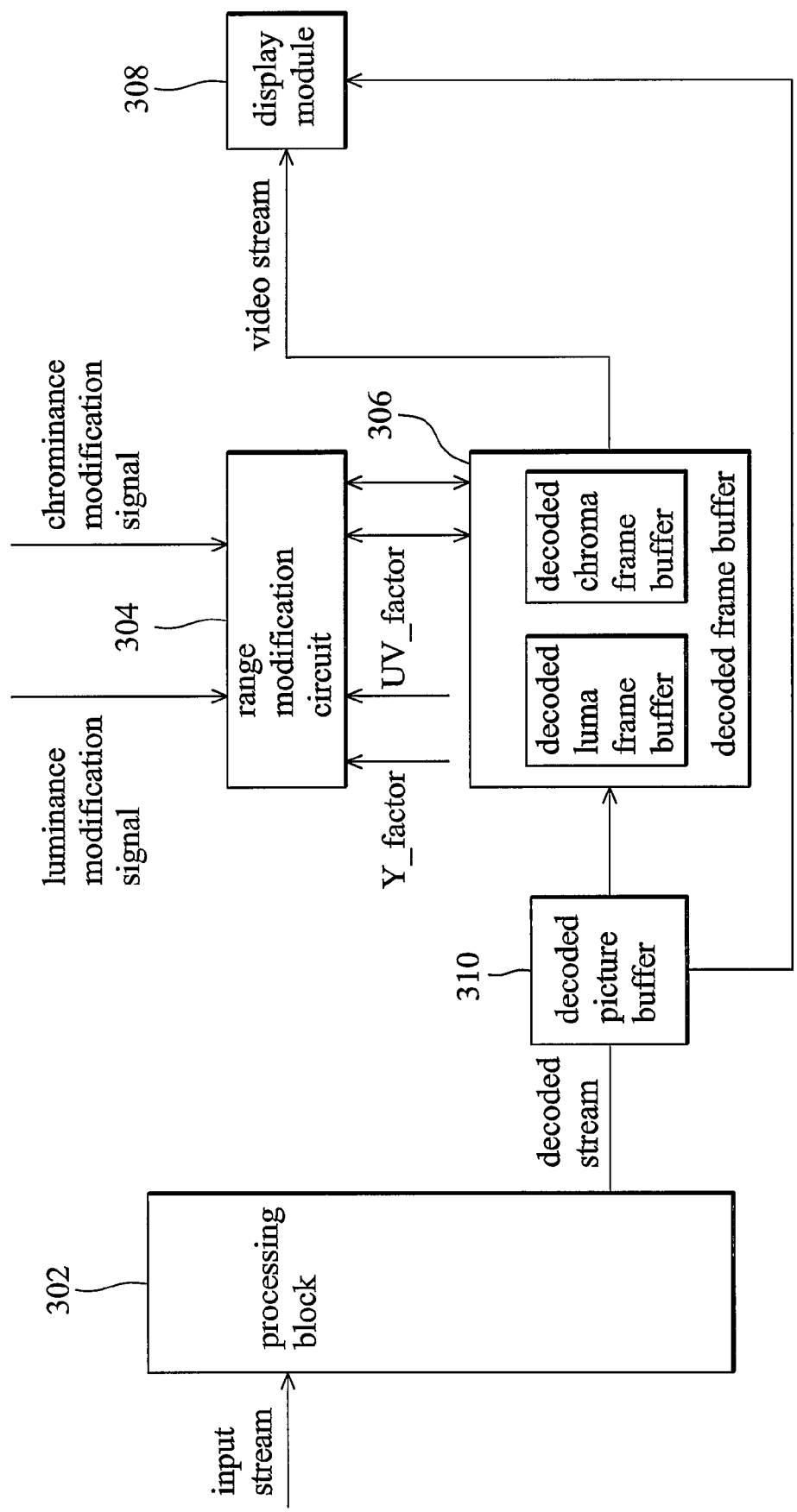
FIG. 3 shows a block diagram of a system for outputting a video stream according to an embodiment of the invention.

FIG. 3 shows another block diagram of a system for outputting a video stream according to an embodiment of the invention. A processing block 302 decodes the input stream to a decoded stream. A decoding picture buffer 310 stores the decoded stream, which can be located inside or outside of the processing block 302. A decoded frame buffer 306 comprises buffers for separately storing the luminance component and the chrominance component. In general, a decoded picture buffer of the processing block 302 could also be separated into decoded luma picture buffer for storing luminance component and decoded chroma picture buffer for storing chrominance component. The decoded stream is read from a decoded picture buffer 310 and stored in the decoded frame buffer 306. A range modification circuit 304 retrieves the luminance component from the decoded luma frame buffer of the decoded frame buffer and modifies a luminance range of the luminance component if a luminance modification signal is true. The range modification circuit 304 retrieves the chrominance component from the decoded chroma frame buffer of the decoded frame buffer and modifies a chrominance range of the chrominance component if a chrominance modification signal is true. The modified luminance component and the modified chrominance component are stored in the decoded frame buffer. The decoded frame buffer 306 then outputs a video stream. The video stream comprises the modified luminance component when the luminance modification signal is true, and the video stream comprises the luminance component when the luminance modification is false. Similarly, the video stream comprises the modified chrominance component when the chrominance modification signal is true, and the video stream comprises the chrominance component when the chrominance modification signal is false. A display module 308 may concatenate the decoded frame buffer 306 for displaying the video stream. When the luminance modification signal is false, the luminance is outputted from the decoded frame buffer 306 or the decoded picture buffer 310 without the range modification processing. In some embodiments, when the luminance modification signal is false and the luminance is outputted from the decoded picture buffer 310 without the range modification processing, the operation that reading the luminance component of the decoded stream from the decoded picture buffer 310 and stored in the decoded frame buffer 306 can be avoided to save memory bandwidth and storage. Similarly, when the chrominance modification signal is false, the chrominance is outputted from the decoded frame buffer 306 or the decoded picture buffer 310 without the range modification processing. In some embodiments, when the chrominance modification signal is false and the chrominance is outputted from the decoded picture buffer 310 without the range modification processing, the operation that reading the chrominance component of the decoded stream from the decoded picture buffer 310 and stored in the decoded frame buffer 306 can be avoided to save memory bandwidth and storage. The range modification circuit 304 and the decoded picture buffer 310 can be similar to blocks 104 and 108 respectively, further description is thus omitted for brevity.

In some embodiments, when neither of the luminance modification signal and the chrominance modification is true, the decoded picture buffer 310 sends the video stream directly to the display module 308 or the decoded frame buffer 306 sends the video stream directly to the display module 308 without ranging modification.

Figure 4:
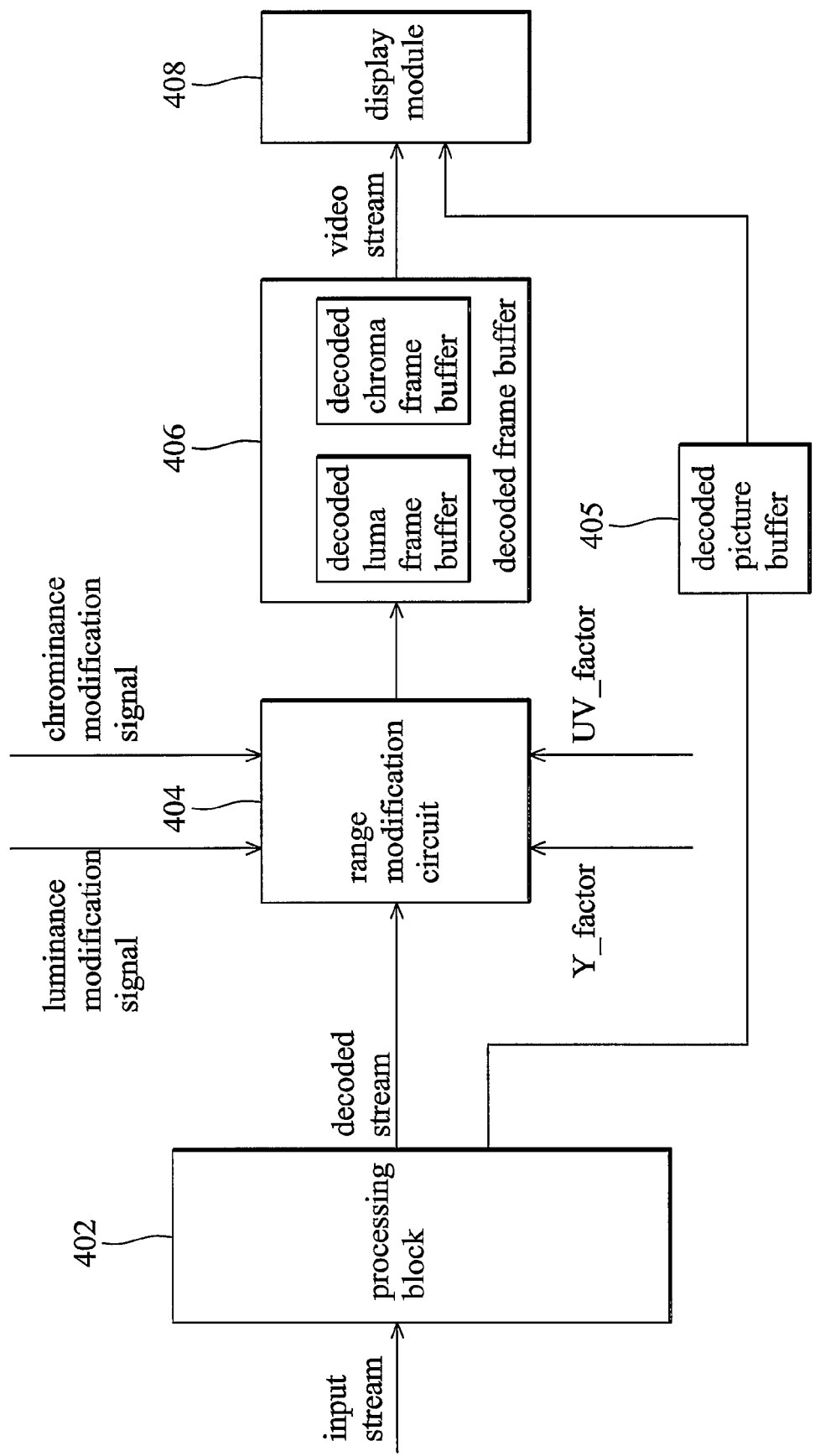
FIG. 4 shows a block diagram of a system for outputting a video stream according to an embodiment of the invention.

FIG. 4 shows another block diagram of a system for outputting a video stream according to an embodiment of the invention. A processing block 402 decodes the input stream to a decoded stream. The decoded stream comprises a luminance component and a chrominance component. A range modification circuit 404 modifies a luminance range of the luminance component if a luminance modification signal is true and modifies a chrominance range of the chrominance component if a chrominance modification signal is true. A decoded frame buffer 406 stores the modified chrominance component and the modified luminance component and outputs a video stream. The video stream comprises the modified luminance component when the luminance modification signal is true. When the chrominance modification signal is true, the video stream comprises the modified chrominance component. When the luminance modification signal is false, the luminance component of the video stream is outputted from the decoded picture buffer 405 or outputted through the range modification circuit 404 and the decoded frame buffer 406 but without processing any range modification processes; and, when the chrominance modification signal is false, the chrominance component of the video stream is outputted from the decoded picture buffer 405 or outputted through the range modification circuit 404 and the decoded frame buffer 406 but without processing any range modification processes. A display module 408 may concatenate the decoded frame buffer 306 for displaying the video stream.

Figure 5:
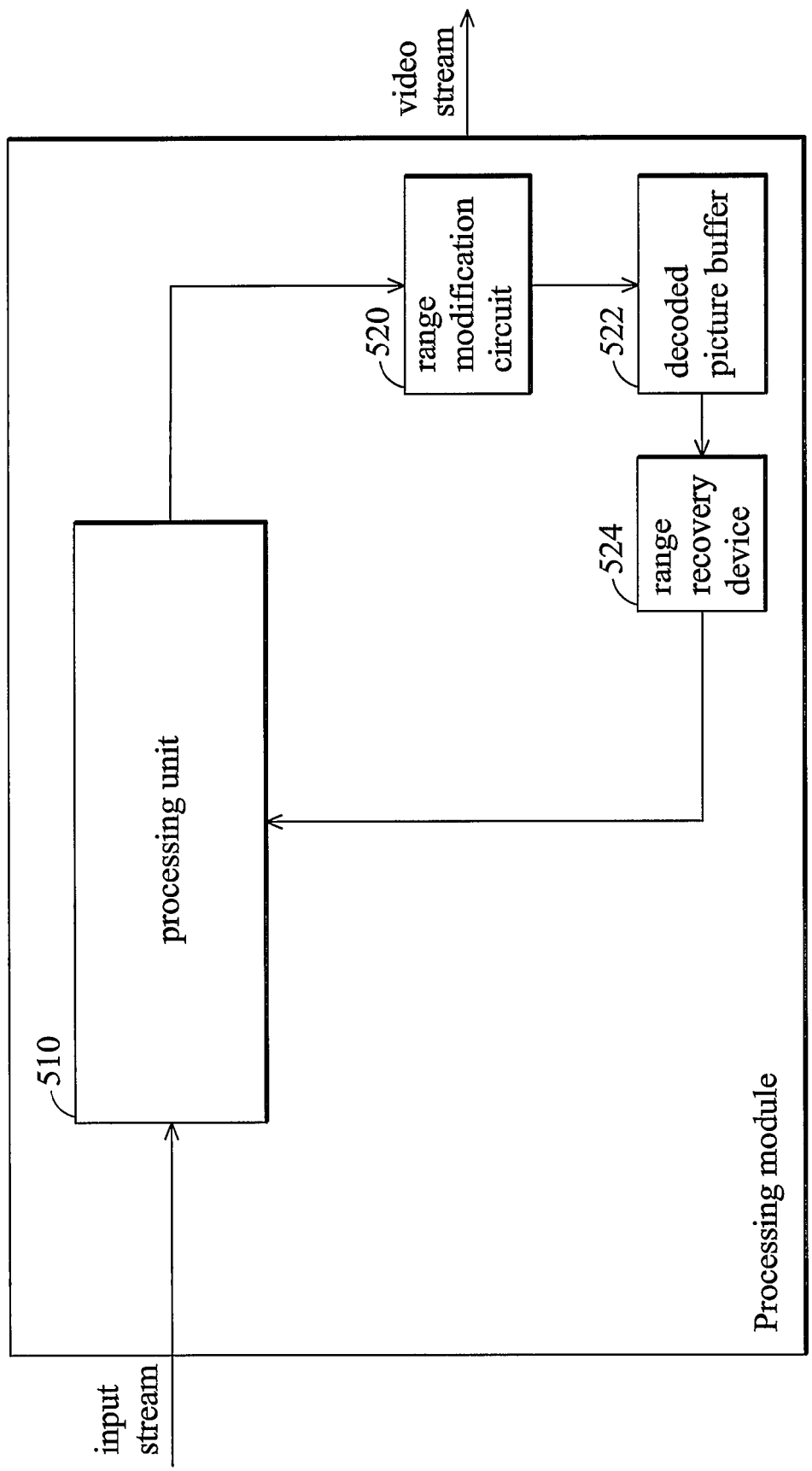
FIG. 5 shows a block diagram of a system for outputting a video stream according to an embodiment of the invention.

FIG. 5 shows another block diagram of a system for outputting a video stream according to an embodiment of the invention. The system comprises a processing unit 510, a range modification circuit 520, a decoded picture buffer 522, and a range recovery device 524. The processing unit 510 decodes and stores an input stream comprising a luminance component and a chrominance component. The range modification circuit 520 modifies a luminance range of the luminance components retrieved from the processing unit 510 if a luminance modification signal is true, otherwise, the range modification circuit 520 directly outputs the luminance component retrieved from the processing unit 510 without modifying the luminance component. The range modification circuit 520 also modifies a chrominance range of the chrominance components retrieved from the processing unit 510 if a chrominance modification signal is true, otherwise, the range modification circuit 520 directly outputs the chrominance component retrieved from the processing unit 510 without modifying the chrominance component. The decoded picture buffer 522 stores the luminance components and chrominance components outputted by range modification circuit 520. The decoded picture buffer 522 further outputs a video stream to a display module (not shown). The video stream comprises the modified luminance component when the luminance modification signal is true, and the video stream comprises the luminance component when the luminance modification is false. Similarly, the video stream comprises the modified chrominance component when the chrominance modification signal is true, and the video stream comprises the chrominance component when the chrominance modification signal is false. The range recovery device 524 inverts the modified luminance components to the luminance component and inverts the modified chrominance component to the chrominance component.

Conventional range modification requires that frame data be read from a memory device twice and data be written to the memory device twice. In some embodiments, the luminance component and the chrominance component are stored separately to prevent accessing of the entire frame data. However, one of the advantages for the presented embodiments is that the luminance component and the chrominance component could directly send to a display module. Thus, unnecessary storage and retrieval of unmodified data is eliminated. The systems and method provided of the invention reduce memory access time to achieve the rapid decoding.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An apparatus for outputting a video stream, comprising:
    a processing block for decoding an input stream;
    a decoded picture buffer for storing the decoded input stream, wherein the decoded input stream comprises a luminance component and a chrominance component; and
    a display block for outputting a video stream, wherein the display block comprises:
        a range modification unit for retrieving the decoded input stream from the decoded picture buffer, wherein a luminance range of the luminance component of the decoded input stream is modified according to a luminance modification signal, and a chrominance range of the chrominance component of the decoded stream is modified according to a chrominance modification signal; and
        a display module coupled to a range modification unit for outputting the video stream; wherein the video stream is generated according to an output of the range modification unit.

2. The apparatus as claimed in claim 1, wherein the luminance range of the luminance component of the decoded input stream is modified if the luminance modification signal is true, and a chrominance range of the chrominance component of the decoded input stream is modified if the chrominance modification signal is true.

3. The apparatus as claimed in claim 1, wherein the video stream comprises the modified luminance component if the luminance modification signal is true; and the video stream comprises the modified chrominance component if the chrominance modification signal is true.

4. The apparatus as claimed in claim 1, wherein the range modification unit directly output the luminance component of the decoded input stream retrieved from the decoded picture buffer to the display module if the luminance modification signal is false; and the range modification unit directly output the chrominance component of the decoded input stream retrieved from the decoded picture buffer to the display module if the chrominance modification signal is false.

5. The apparatus as claimed in claim 1, wherein the luminance component of the decoded input stream retrieved from the decoded picture buffer is directly output to the display module and bypass the range modification unit if the luminance modification signal is false; and the chrominance component of the decoded input stream retrieved from the decoded picture buffer is directly output to the display module and bypass the range modification unit if the chrominance modification signal is false.

6. The apparatus as claimed in claim 1, wherein the range modification unit performs the following formula to modify the luminance range of the luminance component:
    $Y'[n]=CLIP((((Y[n]-128)*(Y\_factor+9)+4)>>3)+128)$,
    wherein $Y[n]$ is the luma component of the decoded stream, $Y\_factor$ is a luma modification factor, and $Y'[n]$ is the modified luma component; the range modification circuit further performs the following formula to modify the chrominance range of the chrominance component:
    $Cb'[n]=CLIP((((Cb[n]-128)*(UV\_factor+9)+4)>>3)+128)$;
    $Cr'[n]=CLIP((((Cr[n]-128)*(UV\_factor+9)+4)>>3)+128)$, wherein $Cb[n]$ is the Cb portion of the chrominance component, $Cr[n]$ is the Cr portion of the chrominance component, $UV\_factor$ is a chrominance modification factor, and $Cb'[n]$ and $Cr'[n]$ are the modified chrominance components.

7. The apparatus as claimed in claim 6, wherein values of the modified luma component $Y'[n]$, and the modified chrominance components $Cb'[n]$ and $Cr'[n]$ are from 0 to 255.

8. A method for outputting a video stream, comprising:
    decoding an input stream;
    storing the decoded input stream, wherein the decoded input stream comprises a luminance component and a chrominance component;
    modifying a luminance range of the luminance component to generate a modified luminance component if a luminance modification signal is true;
    modifying a chrominance range of the chrominance component to generate a modified chrominance component if a chrominance modification signal is true; and
    outputting a video stream, wherein the video stream comprises the modified luminance component if the luminance modification signal is true; otherwise, the video stream comprises the luminance component of the decoded input stream without being modified, and the video stream comprises the modified chrominance component if the chrominance modification signal is true; otherwise, the video stream comprises the chrominance component of the decoded input stream without being modified.

9. The method as claimed in claim 8, wherein modifying the luminance range comprises performing the following formula to modify the luminance range of the luminance component:
    $Y'[n]=CLIP((((Y[n]-128)*(Y\_factor+9)+4)>>3)+128)$,
    wherein $Y[n]$ is the luminance component of the decoded stream, $Y\_factor$ is a luma modification factor, and $Y'[n]$ is the modified luminance component; modifying the chrominance component comprises performing the following formula to modify the chrominance range of the chrominance component:
    $Cb'[n]=CLIP((((Cb[n]-128)*(UV\_factor+9)+4)>>3)+128)$;
    $Cr'[n]=CLIP((((Cr[n]-128)*(UV\_factor+9)+4)>>3)+128)$, wherein $Cb[n]$ is the Cb portion of the chrominance component, $Cr[n]$ is the Cr portion of the chrominance component, $UV\_factor$ is a chrominance modification factor, and $Cb'[n]$ and $Cr'[n]$ are the modified chrominance components.

10. The method as claimed in claim 9, wherein values of the modified luminance component $Y'[n]$, and the modified chrominance components $Cb'[n]$ and $Cr'[n]$ are from 0 to 255.

11. An apparatus for outputting a video stream, comprising:

a processing block for decoding an input stream;
a decoded picture buffer for storing the decoded input stream, wherein the decoded input stream comprises a luminance component and a chrominance component;
a decoded frame buffer for storing the luminance component of the decoded input stream retrieved from the decoded picture buffer if a luminance modification signal flag is true and storing the chrominance component of the decoded input stream retrieved from the decoded picture buffer if a chrominance modification signal flag is true, wherein the decoded frame buffer include two buffer sets, a decoded luminance frame buffer and a decoded chrominance frame buffer, to separate the luminance component and the chrominance component;
a range modification unit for retrieving the luminance component from the decoded luminance frame buffer and modifying a luminance range of the luminance component, and for retrieving the chrominance component from the decoded chrominance frame buffer and modifying a chrominance range of the chrominance component; and
a display module coupled to the decoded frame buffer for outputting a video stream, wherein the video stream comprises the modified luminance component if the luminance modification signal flag is true, and the video stream comprises modified chrominance component if the chrominance modification signal flag is true.

12. The apparatus as claimed in claim 11, wherein a decoded frame buffer for storing the luminance component of the decoded input stream retrieved from the decoded picture buffer if the luminance modification signal flag is true; otherwise, the luminance component of the decoded input stream retrieved from the decoded picture buffer is directly output to the display module and bypassed the decoded frame buffer, and storing the chrominance component of the decoded input stream retrieved from the decoded picture buffer and bypassed the decoded frame buffer if the chrominance modification signal flag is true; otherwise, the chrominance component of the decoded input stream retrieved from the decoded picture buffer is directly output to the display module.

13. The apparatus as claimed in claim 11, wherein the luminance component of the decoded input stream is directly output to the display module from decoded frame buffer and bypassed the range modification unit if the luminance modification signal flag is false, and the chrominance component of the decoded input stream is directly output to the display module from decoded frame buffer and bypassed the range modification unit if the chrominance modification signal flag is false.

14. An apparatus for outputting a video stream, comprising:
a processing block for decoding an input stream and generating the decoded input stream, wherein the decoded input stream comprises a luminance component and a chrominance component;
a range modification unit for modifying a luminance range of the luminance component retrieved from the processing block if a luminance modification signal flag is true, and modifying a chrominance range of the chrominance component retrieved from the processing block if a chrominance modification signal flag is true;
a decoded frame buffer storing the modified chrominance component and the modified luminance component; and
a display module coupled to the decoded frame buffer for outputting a video stream, wherein the video stream comprises a modified luminance component if the luminance modification signal flag is true, and the video stream comprises the modified chrominance component if the chrominance modification signal flag is true,
wherein the luminance component is directly output to the display module from the processing block if the luminance modification signal flag is false, and the chrominance component is directly output to the display module from the processing block if the chrominance modification signal flag is false.

15. An apparatus for outputting a video stream, comprising:
a processing unit for decoding an input stream and generating the decoded input stream, wherein the decoded input stream comprises a luminance component and a chrominance component;
a range modification unit modifying a luminance range of the luminance component retrieved from the processing unit if a luminance modification signal flag is true; otherwise, the range modification unit directly outputting the luminance component retrieved from the processing unit without modifying the luminance component, and modifying a chrominance range of the chrominance component retrieved from the processing unit if a chrominance modification signal flag is true; otherwise, the range modification unit directly outputting the chrominance component retrieved from the processing unit block without modifying the chrominance component;
a decoded frame buffer storing the modified chrominance component and the modified luminance component; and
a display module coupled to the decoded frame buffer for outputting a video stream, wherein the video stream comprises a modified luminance component if the luminance modification signal flag is true, and the video stream comprises the modified chrominance component if the chrominance modification signal flag is true.

16. An apparatus for outputting a video stream, comprising:
a processing unit for decoding an input stream and generating the decoded input stream, wherein the decoded input stream comprises a luminance component and a chrominance component;
a range modification unit modifying a luminance range of the luminance component retrieved from the processing unit if a luminance modification signal flag is true; otherwise, the range modification unit directly outputting the luminance component retrieved from the processing unit without modifying the luminance component, and modifying a chrominance range of the chrominance component retrieved from the processing unit if a chrominance modification signal flag is true; otherwise, the range modification unit directly outputting the chrominance component retrieved from the processing unit without modifying the chrominance component;
a decoded buffer storing at least one of the luminance components and the modified luminance components, and at least one of the chrominance components and the modified chrominance components;
a range recovery device for inverting the modified luminance component to the luminance component and inverting the modified chrominance component to the chrominance component, and sending an inverted luminance component and an inverted chrominance component to the processing unit; and
a display module coupled to the decoded frame buffer for outputting a video stream, wherein the video stream comprises the modified luminance component if the luminance modification signal flag is true, and the video stream comprises the modified chrominance component if the chrominance modification signal flag is true.

* * * * *